Feb. 23, 1943.     O. R. BRINEY, JR     2,311,815
BEARING
Filed May 21, 1942

INVENTOR.
OTTIS R. BRINEY, JR.
BY
ATTORNEYS

Patented Feb. 23, 1943

2,311,815

UNITED STATES PATENT OFFICE 2,311,815

BEARING

Ottis R. Briney, Jr., Pontiac, Mich.

Application May 21, 1942, Serial No. 443,870

11 Claims. (Cl. 308—189)

This invention relates broadly to anti-friction bearings and more specifically to journal bearings for shafts and machine sub-assemblies which are rotated at relatively slow rates of speed and simultaneously reciprocated.

The invention further comprehends a bearing which will support an out bored shaft or machine sub-assembly without appreciable axial deflection or frictional constraint.

One of the objects of the invention is to provide a bearing which is formed to engage a journal without running clearance yet facilitate a free rotative and reciprocative movement thereof with minimized frictional resistance.

Another object of the invention is to provide a bearing which will support an out bored, rotatively driven reciprocative shaft without axial deflection or eccentricity.

Another object of the invention is to provide an anti-friction bearing for a rotatively and reciprocatively driven shaft in which the anti-friction member is impinged between the shaft and outer fixed race under sufficient pressure to eliminate transaxial movements and vibration.

Another object of the invention is to provide a bearing for a rotatively and reciprocatively driven shaft which embodies a roving anti-friction member designed for movement with the shaft and designed further to arrest the movement of the shaft when movement of the roving member is restrained.

Other objects and advantages more or less ancillary to the foregoing and the manner in which all the various objects are realized will appear in the following description, which considered in connection with the accompanying drawing, sets forth the preferred embodiment of the invention.

Referring to the drawing.

Figure 1:
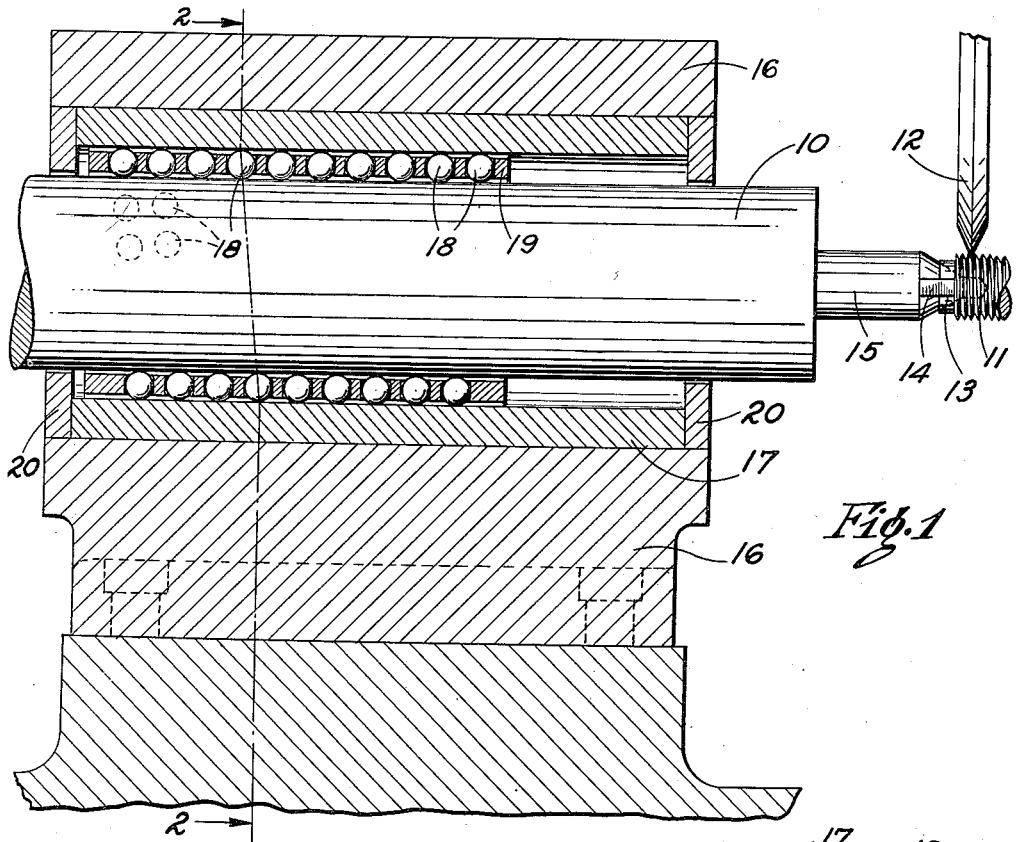
Fig. 1 is a vertical sectional view through the bearing structure embodying the present invention.

As illustrated in Fig. 1, the bearing is shown as associated with the drive spindle of a thread grinding machine of the type in which the spindle is axially advanced and simultaneously rotated under the influence of a master lead screw. In such environs the spindle 10 is provided with a live center for producing the requisite movement of the work piece 11 in relation to the grinding wheel 12. The work piece as illustrated is formed with a slot 13 in the end portion thereof which is engaged by a tongue 14 constituting the driving element for the center 15.

Figures 2, 3:
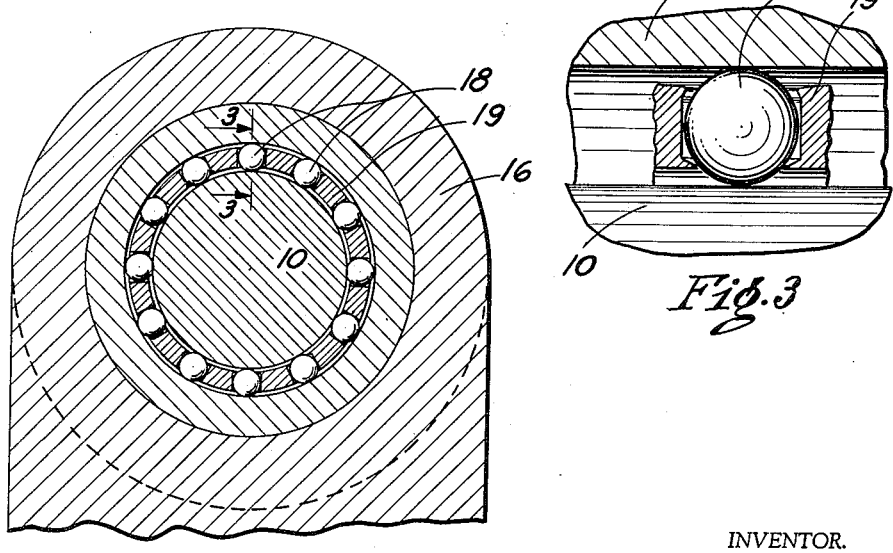
Fig. 2 is a transverse section therethrough, the section being taken on a plane indicated by the line 2—2 in Fig. 1.
Fig. 3 is an enlarged sectional view through a fragmentary portion of the bearing separator illustrating the manner in which the balls are mounted therein.

The improved bearing comprises a frame or housing 16 having a lineal bore therein for the reception of a hardened and ground steel sleeve or bushing 17 which is preferably assembled in the housing 16 under a light press fit. The spindle is supported within the sleeve 17 by an anti-friction carriage which embodies a plurality of steel balls 18 mounted in a fabricated tube or separator 19 formed of brass or some similar ductile metal. The wall thickness of the separator is less than the diametric dimensions of the balls and the holes therein are formed as shown in Fig. 3 with lips or inturned flanges in their outer ends to prevent the ball from falling therefrom. The carriage may be constructed by drilling the body of the tube to a depth where the point of the drill will break through the inner wall thereof, next placing balls in the holes so drilled, then securing the balls in place by peaning or upsetting the metal about the outer ends of the drilled openings. The ball seats may be arranged in the form of a helix or arranged in parallel circumferential rows, the balls in either case being disposed in staggered relation axially (as shown in dotted lines in Fig. 1) in order to prevent adjacent balls from tracking the spindle 10.

The spindle is preferably hardened and ground or machined to a diameter which when added to the double diameter of the balls is slightly larger than the ground hole in the bushing 17. Thus if the bore of the bushing were 2.000 inches and the diameter of the balls were .250 of an inch the shaft should be ground 1.501 so that the bushing would be highly stressed and expanded when the balls and shaft are forced therein.

As will be seen in Fig. 1, the housing and bushing are formed to accommodate translation of the separator, the lineal dimensions of the bushing and separator being designed to afford one half the contemplated travel of the spindle.

In practice it has been found that with the balls thus compressively retained within the bushing the spindle may be rotated and moved axially with the spindle under application of the slightest pressure.

The housing is constructed with end plates 20 which, if desired, may be provided with felt rings to prevent the entry of dirt or foreign matter into the bearing. With the balls impinged in the manner described in the foregoing, movement of the spindle 10 will be arrested when the ends of the separator are brought into abutting engagement with the plates. The utility of this feature of construction may be advantageously employed, though not specifically illustrated herein, in such structures as require the use of adjustable stop mechanisms.

From the foregoing it will be recognized that since no running clearance is provided in the improved bearing a machine part mounted therein will be free from axial deviation, vibration and eccentricity, that the part may be moved with minimized frictional resistance and that the bearing will afford both rotative and axial movements. Moreover, since the bearing offers no lineal limitations the separator may be made of adequate length to support an out bored shaft or heavy over hanging part without axial deflection or eccentricity in the free end thereof.

Although the improved bearing is illustrated herein as associated with the spindle of a thread grinding machine, it is to be understood that the invention may be employed with equal facility in machines having shafts or machine sub-assemblies which are reciprocated and indexed or machine parts which are rotated at low rates of speed and axially advanced or retracted independent of the rotative movement.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. An anti-friction bearing for a rotatable axially movable shaft comprising a ball race having a bore therein, a ball separator arranged for axial movement within said bore and a plurality of balls supported in said separator and forced between said shaft and said bore in said race.

2. An anti-friction bearing for a rotatable axially movable shaft comprising a hardened steel tube defining a bore and constituting an outer ball race, a ball separator arranged for axial movement therein, a hardened steel shaft constituting an inner ball race, balls of equal size supported by said separator and engaged with said inner and outer ball race, the diameter of the inner race added to the double diameter of one of said balls being greater than the bore in said tube.

3. An anti-friction bearing for an axially movable, slowly rotatable shaft comprising a housing, a steel sleeve therein defining a bore, a ball separator shorter than the length of said sleeve within the bore, a rotatable member within the bore, balls circumambient said member and supported by said separator, the diametric dimension of said member and said balls being greater than the diameter of the bore in said sleeve.

4. An anti-friction bearing for an axially movable, slowly rotatable shaft comprising a housing, a hardened and ground steel sleeve affixed within said housing, the walls of said sleeve defining a bore constituting an outer ball race, a ball separator within said bore, the length of said sleeve being greater than the length of said separator, a cylindrical member within said separator, constituting an inner ball race, a plurality of balls supported in said separator and engaged with the inner and outer ball races, the inner ball race and balls being constructed for a drive fit within said outer ball race.

5. An anti-friction bearing for an axially movable, slowly rotatable shaft comprising a fixed housing, a hardened and ground steel bushing therein, the walls of said bushing defining a bore, a ball separator arranged for axial movement in said bushing, abutments adjacent the end portions of said housing to arrest the axial movement of said separator, a hardened and ground shaft in said separator, a plurality of balls supported by said separator and impinged between said shaft and the inner wall of said bushing, the dimension of the bore in said bushing being constructed in relation to the diametric dimension of said shaft and said balls to effect the deformation of the wall of the bushing when the shaft and balls are forced therein.

6. An anti-friction bearing for an axially movable, slowly rotatable shaft comprising a housing, a steel bushing therein, the wall thereof defining a bore, a soft metal tube therein having openings disposed in staggered relation in the perimeter thereof, said tube being shorter than said bushing, balls in said openings protruding from the inner and outer side walls of said tube, a hardened and ground cylindrical member within said tube, said balls being mounted in press fit engagement between said cylindrical member and the walls defining the bore in said bushing.

7. An anti-friction bearing for an axially movable, slowly rotatable cylindrical member comprising a bearing cage having a bore therein, a journal in said bore, a roving ball separator in said bore circumambient said journal, balls in said separator press fitted between said bore and said journal and means associated with said bearing cage and said separator to arrest the axial movement of the cylindrical member.

8. A bearing for a rotatable reciprocative shaft comprising a tube mounted in a fixed position, a ball separator therein shorter in length than said tube, stop plates in the ends of said tube, an axially movable journal within said separator and balls in press fit relation between the inner wall of said tube and said journal, whereby axial movement of said journal is arrested when said separator abuts said stop plates.

9. In a thread grinding machine embodying a rotatable reciprocative spindle, a bearing therefor comprising a housing, a hardened steel bushing therein, the walls of said bushing defining a bore, a ball separator in said bore, balls supported by said separator and engaged with said spindle and said bore, the difference between the diameters of the spindle and the bore being less than the sum of the diameters of two diametrically opposed balls.

10. An anti-friction bearing comprising a fixed bushing defining a bore, a ball separator therein, the length of said separator being greater than one-half the length of said bushing, an axially movable shaft within said separator, balls supported in said separator and forced under a drive fit between said bore and said shaft, and stops in the opposed ends of said bushing engageable with said separator to delimit the axial movement of said shaft.

11. An anti-friction bearing for an axially movable, slowly rotatable shaft comprising a housing having an opening therein defining a bore, a rotatable cylindrical member within said bore, a plurality of balls within said bore and circumambient said member, the diametric dimensions of said member and said balls being greater than the diameter of said bore.

OTTIS R. BRINEY, Jr.